United States Patent
Gredegård et al.

(10) Patent No.: US 10,152,551 B2
(45) Date of Patent: Dec. 11, 2018

(54) CALIBRATION DATA IN A SENSOR SYSTEM

(71) Applicant: AXIS AB, Lund (SE)

(72) Inventors: Henning Gredegård, Lund (SE);
Magnus Mårtensson, Bjärred (SE);
Henrik Fasth, Kristianstad (SE);
Mårten Lindahl, Veberöd (SE);
Joakim Olsson, Lund (SE); Martin Santesson, Limhamn (SE)

(73) Assignee: Axis AB, Lund (SE)

( * ) Notice: Subject to any disclaimer, the term of this patent is extended or adjusted under 35 U.S.C. 154(b) by 227 days.

(21) Appl. No.: 14/719,289

(22) Filed: May 21, 2015

(65) Prior Publication Data

US 2015/0347607 A1 Dec. 3, 2015

(30) Foreign Application Priority Data

May 28, 2014 (EP) .................................... 14170150

(51) Int. Cl.
*G06F 7/00* (2006.01)
*G06F 17/30* (2006.01)
*H04L 9/32* (2006.01)
*G01D 18/00* (2006.01)

(52) U.S. Cl.
CPC ..... *G06F 17/30876* (2013.01); *G01D 18/008* (2013.01); *H04L 9/3236* (2013.01); *H04L 9/3239* (2013.01)

(58) Field of Classification Search
None
See application file for complete search history.

(56) References Cited

U.S. PATENT DOCUMENTS

| | | | |
|---|---|---|---|
| 5,839,094 A | 11/1998 | French | |
| 7,126,629 B1 | 10/2006 | Braunstein et al. | |
| 7,502,066 B1 | 3/2009 | Merrill et al. | |
| 7,855,727 B2 | 12/2010 | Adler et al. | |
| 7,995,855 B2 | 8/2011 | Albu et al. | |

(Continued)

FOREIGN PATENT DOCUMENTS

| | | |
|---|---|---|
| CN | 1837836 A | 9/2006 |
| CN | 102547304 A | 7/2012 |

(Continued)

*Primary Examiner* — James Trujillo
*Assistant Examiner* — John J Morris
(74) *Attorney, Agent, or Firm* — Volpe and Koenig, P.C.

(57) ABSTRACT

A method performed in a processing unit for determining calibration data to be used when processing data from a sensor unit connected to the processing unit, the method including receiving, from the sensor unit, an identifier which identifies and is calculated based on calibration data stored in the sensor unit, checking if there is an identifier stored in the processing unit identical to the received identifier, where the identifier stored in the processing unit identifies and is calculated based on calibration data stored in the processing unit, if an identical identifier is stored in the processing unit, using the calibration data stored in the processing unit identified by the identical identifier when processing data from the sensor unit, if no identical identifier is stored in the processing unit, requesting the sensor unit to transmit calibration data, and using the requested calibration data when processing data from the sensor unit.

15 Claims, 4 Drawing Sheets

(56) References Cited

U.S. PATENT DOCUMENTS

| | | |
|---|---|---|
| 8,049,789 B2 | 11/2011 | Innocent |
| 8,314,865 B2 | 11/2012 | Muukki et al. |
| 8,466,974 B2 | 6/2013 | Yu et al. |
| 8,780,225 B2 | 7/2014 | Bai et al. |
| 2003/0206231 A1 | 11/2003 | Chen et al. |
| 2004/0090534 A1 | 5/2004 | Nakami et al. |
| 2004/0239798 A1 | 12/2004 | Nayar et al. |
| 2005/0033540 A1* | 2/2005 | Bathurst ............ G01D 11/245 702/117 |
| 2006/0214795 A1 | 9/2006 | Kim |
| 2008/0100704 A1 | 5/2008 | Venetianer et al. |
| 2008/0276092 A1* | 11/2008 | Eberhardt ............ H04L 9/3236 713/175 |
| 2009/0169120 A1 | 7/2009 | Otani |
| 2009/0210722 A1* | 8/2009 | Russo ................ H04L 9/0866 713/189 |
| 2010/0110209 A1 | 5/2010 | Border et al. |
| 2010/0118169 A1 | 5/2010 | Yu et al. |
| 2010/0175074 A1 | 7/2010 | Kanada |
| 2010/0321506 A1 | 12/2010 | Li et al. |
| 2011/0149116 A1 | 6/2011 | Kim |
| 2011/0187859 A1 | 8/2011 | Edelson |
| 2011/0230995 A1 | 9/2011 | Irwin et al. |
| 2011/0242370 A1 | 10/2011 | Endo |
| 2011/0302347 A1 | 12/2011 | Schubert et al. |
| 2012/0081519 A1 | 4/2012 | Goma et al. |
| 2012/0081566 A1 | 4/2012 | Côté et al. |
| 2012/0105374 A1 | 5/2012 | Chen et al. |
| 2012/0273910 A1 | 11/2012 | Hochschulz et al. |
| 2012/0274786 A1 | 11/2012 | Wang |
| 2012/0278796 A1 | 11/2012 | Sandlin et al. |
| 2013/0012263 A1 | 1/2013 | Goto et al. |
| 2013/0182177 A1 | 7/2013 | Furlan |
| 2013/0182756 A1 | 7/2013 | Furlan |
| 2013/0328825 A1 | 12/2013 | Brown et al. |
| 2014/0036072 A1 | 2/2014 | Lyall et al. |
| 2014/0146185 A1 | 5/2014 | Kammermark et al. |

FOREIGN PATENT DOCUMENTS

| | | |
|---|---|---|
| EP | 1048933 A1 | 11/2000 |
| JP | 2004193683 A | 7/2004 |
| TW | 201415202 A | 4/2014 |
| WO | 03001331 A2 | 1/2003 |

* cited by examiner

CALIBRATION DATA IN A SENSOR SYSTEM

CROSS REFERENCE TO RELATED APPLICATION

This application claims the benefit of European Patent Application No 14170150.8 filed on May 28, 2014, which is incorporated by reference as if fully set forth.

FIELD OF INVENTION

The present invention relates to a method, a processing unit and a sensor system for determining calibration data to be used when processing data from a sensor unit of the sensor system.

BACKGROUND

There are sensor system installations that require small sensor units because of restrictions in installation space or in order to enable the sensor units to be disguised. For example, in a monitoring or surveillance installation, it may be advantageous if the camera, microphone or any other required sensor such as a magnetic sensor, is small and thus can be disguised. One example of such installations is installations at ATMs (Automated Teller Machines), where at least one of the cameras generally is invisible or almost invisible.

Moreover, it may be advantageous to separate the sensor unit from the processing unit in a sensor system in order to facilitate exchangeability of the sensor unit without needing to replace the processing unit. For example the sensor unit may comprise limited logic capabilities and includes as little electronics as possible, and the processing unit may include the more power requiring electronics and the processing capability of the sensor system. The exchangeability may be advantageous for maintenance reasons or when the requirements of the sensor unit in the sensor system are changed.

When the processing unit is processing data from the sensor unit, calibration data defining specifics of the sensor unit is often required since each individual sensor unit may measure the sensed physical quantity differently compared to another sensor unit of the same sort.

A solution to this problem is described in U.S. Pat. No. 8,466,974B2 (O2Micro Inc.). In this document, an identification value of the sensor unit is stored along with the calibration data for the sensor unit, for example in a memory in the sensor unit. This identification value can then be used for identifying which sensor unit that is connected to the processing unit such that the processing unit knows which calibration data to use. A problem with this solution is that it must be ensured that the identification value is unique for each sensor unit, which may be difficult from a manufacturing point of view. Moreover, in the case the sensor unit is recalibrated, also the identification value needs to be updated and still be unique.

SUMMARY

In view of the above, an objective of the invention is to provide an improved way of determining calibration data to be used when processing data from a sensor unit in a processing unit. Generally, the above objective is achieved by the attached independent patent claims.

According to a first aspect, the present invention is realized by a method performed in a processing unit for determining calibration data to be used when processing data from a sensor unit connected to the processing unit, the method comprising the steps of: receiving, from the sensor unit, an identifier which identifies and is calculated based on calibration data stored in the sensor unit, checking if there is an identifier stored in the processing unit that is identical to the received identifier, wherein the identifier stored in the processing unit identifies and is calculated based on calibration data stored in the processing unit, if an identical identifier is stored in the processing unit, using the calibration data stored in the processing unit identified by the identical identifier when processing data from the sensor unit, if no identical identifier is stored in the processing unit, requesting the sensor unit to transmit calibration data, and using the requested calibration data when processing data from the sensor unit.

The present invention is based on the realization that an individual sensor unit can be identified by calibration data for that sensor unit. By basing the identifier on the calibration data, no specific unique sensor identifier needs to be implemented when manufacturing the sensor unit. An advantage of the present invention is that a reduced start-up time of a sensor system comprising the sensor unit and the processing unit may be achieved in the case the correct calibration data is already stored in the processing unit. This is achieved by first checking if the calibration data for a connected sensor unit already is stored in the processing unit by comparing the identifiers for the stored calibration data in the processing unit and for the calibration data stored in the sensor unit. The identifier may require less data to be transmitted between the sensor unit and the processing unit for the initial verification that the correct calibration data is stored in the processing unit. This may be particularly advantageous in the case the sensor unit is remotely connected to the processing unit, for example via a bandwidth limited external link.

By performing the above method, the correctness of any calibration data stored in the processing unit may be verified in an improved way since only the identifiers according to above are compared. In the case the identifier of the stored calibration data at the processing unit is not identical to the identifier of the calibration data stored in the sensor unit, the processing unit can request the sensor unit to transmit calibration data, and further use the requested calibration data when processing data from the sensor unit. Consequently, the processing unit may always use the correct calibration data, i.e. the calibration data stored in the sensor unit, when processing data from the sensor unit.

An advantage of having calibration data stored in the sensor unit itself and of having the calibration data accessed from outside the sensor unit, e.g. from the processing unit, is that installation of the sensor system becomes easier because the calibration data is strongly related to the specific sensor unit which is the subject of the calibration data. Moreover, since the processing unit may always verify the correctness of the calibration data stored in the processing unit on start up of the sensor system, the present method facilitates replacement of the sensor unit connected to the processing unit. When replacing a sensor unit with a new sensor unit, the new calibration data, i.e. the calibration data for the new sensor unit, will be loaded into a memory of the processing unit, for example on start-up.

Moreover, by implementing the method according to this embodiment in the processing unit, the sensor unit can be produced and calibrated completely separate from the processing unit, for example in different factories by different companies. This may be advantageous for cost and efficiency reasons.

A further advantage is that re-calibration of the sensor unit connected to the processing unit is facilitated. The re-calibration may mean that new calibration data is stored in the sensor unit, and this new calibration data will be provided to the processing unit when the above is performed. Since new calibration data implies that no identical identifier is stored in the processing unit, new calibration data will be requested from the sensor unit and used by the processing unit when processing data from the sensor unit.

According to some embodiments, after the step of requesting the sensor unit to transmit calibration data, the method further comprises the step of storing the thus received calibration data in the processing unit.

Consequently, the next time the processing unit is determining calibration data to be used when processing data from the same connected sensor unit, for example after a restart of the sensor system, the processing unit will find that the identifier calculated based on calibration data stored in the processing unit and the identifier received from the sensor unit are identical and no new calibration data needs to be transmitted from the sensor unit to the processing unit.

According to some embodiments, each of the identifier received from the sensor unit and the identifier stored in the processing unit is a checksum calculated from the calibration data it identifies. The checksum may be a cryptographic hash function. In other words, the actual procedure yielding each of the identifier, given the calibration data it identifies, may be a cryptographic hash function. Such a checksum algorithm may output identifiers with significantly different values, even for small changes in the calibration data. Consequently, there is a high probability that different calibration data will yield different identifiers. This is advantageous since the use of a correct calibration data may increase the quality of any processed data outputted by the processing unit. Moreover, cryptographic hash functions may advantageously be used to detect corruption errors in the calibration data stored in the processing unit and thus also verify the data integrity of the calibration data stored in the processing unit. Other checksum algorithms, such as a longitudinal parity check may also be used.

Examples of suitable cryptographic hash functions are a MD5 message-digest algorithm, a MD4 message-digest algorithm, SHA-1, SHA-2 and SHA-3. Such cryptographic hash functions are typically easy to compute based on the calibration data. Further, it may be difficult or infeasible to modify calibration data without changing the identifier, and it may be difficult or infeasible to find two different calibration data which generates the same identifier. It may be noted that any suitable cryptographic hash function may be used for calculating the identifier(s).

According to some embodiments, a plurality of identifiers is stored in the processing unit. In this case, the step of checking if there is an identifier stored in the processing unit that is identical to the received identifier is stopped if an identical identifier is found. An advantage of this embodiment is that the method for determining calibration data may be performed more efficiently. There may be several reasons that a plurality of identifiers is stored in the processing unit. For example, several sensor units may be connected to the same processing unit. Another reason may be that several different sensor units have been connected to the processing unit, and that the processing unit is configured to store a certain number of calibration data from previously connected sensor units.

According to some embodiments, the step of checking if there is an identifier stored in the processing unit that is identical to the received identifier comprises the step of: prior to the step of checking if a stored identifier is identical to the received identifier, calculating an identifier based on calibration data stored in the processing unit, temporarily storing the calculated identifier, and wherein the step of checking if there is an identifier stored in the processing unit that is identical to the received identifier comprises using the temporarily stored identifier as the identifier stored in the processing unit.

An advantage of calculating an identifier based on the calibration data stored in the processing unit prior to checking if the identifier is identical to the received identifier from the sensor unit is that a corrupt calibration data stored in the processing unit may be discovered and thus not used. Since, according to this embodiment, the identifier of the calibration data stored in the processing unit is calculated every time the method is performed, this means that a corrupt or otherwise changed calibration data stored on the processing unit will cause the identifier identifying this calibration data to not be identical to the identifier received from the sensor unit. Consequently, the processing unit will request the sensor unit to transmit new calibration data, and using the requested calibration data when processing data from the sensor unit.

According to a second aspect, the present invention provides a processing unit configured for determining calibration data to be used when processing data from a sensor unit connected to the processing unit, the processing unit comprises: a processor configured for receiving, from the sensor unit, an identifier which identifies and is calculated based on calibration data stored in the sensor unit, a memory configured for storing calibration data and an identifier identifying and being calculated based on the calibration data, the processor being configured for checking if an identifier stored in the memory is identical to the received identifier, for using the calibration data identified by the identical identifier and stored in the memory when processing data from the sensor unit if the identifier stored in the memory is identical to the received identifier, and for requesting the sensor unit to transmit calibration data and using the requested calibration data when processing data from the sensor unit if no identical identifier is found.

The memory in the processing unit may be any type of non-volatile memory such as for example ROM, PROM, EPROM, EEPROM, NVRAM, Flash memory, etc. The memory may further comprise a plurality of separate memories.

According to embodiments, the processor is further configured for, after requesting the sensor unit to transmit calibration data, storing the thus received calibration data in the memory.

According to embodiments, each of the identifier received from the sensor unit and the identifier stored in the memory is a checksum calculated from the calibration data it identifies.

According to embodiments, the checksum is a cryptographic hash function.

According to embodiments, the cryptographic hash function is one of a MD5 message-digest algorithm, a MD4 message-digest algorithm, SHA-1, SHA-2 or SHA-3.

According to embodiments, a plurality of identifiers are stored in the memory, and wherein the processor is configured for stop checking if there is an identifier stored in the processing unit that is identical to the received identifier if an identical identifier is found in the memory.

According to embodiments, the processor is further configured for, prior to checking if an identifier stored in the memory is identical to the received identifier, calculating an identifier based on calibration data stored in the memory, temporarily storing the calculated identifier in the memory, and using the temporarily stored identifier when checking if there is an identifier stored in the memory that is identical to the received identifier.

It should be noted that when the processor is calculating an identifier based on calibration data stored in the processing unit, the calculated identifier is inevitably stored in some sort of memory, both during the process of calculating the identifier and after the identifier has been calculated.

According to a third aspect, the present invention provides a sensor system comprising a processing unit according to the second aspect and a sensor unit connected to the processing unit, the sensor unit comprising: a sensor, a memory configured to store calibration data, the calibration data relating to properties of the sensor, wherein the memory is further configured to store an identifier which identifies and is calculated based on the calibration data, a transmitter for transmitting the identifier stored in the memory upon request from processing unit, and a transmitter for transmitting the calibration data stored in the memory upon request from the processing unit.

The transmitter for transmitting the identifier and the calibration data may be implemented by a programmable logic device (PLD) which in addition may act as a non-volatile memory for storing the calibration data and the identifier which identifies and is calculated based on the calibration data. As an alternative to the PLD device, the transmitter for transmitting the identifier and the calibration data may be implemented by a FPGA device. The memory may be a separate unit, for example a ROM, an EEPROM or Flash memory.

The second and third aspect may generally have the same features and advantages as the first aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF THE PREFERRED EMBODIMENTS

Figure 1:
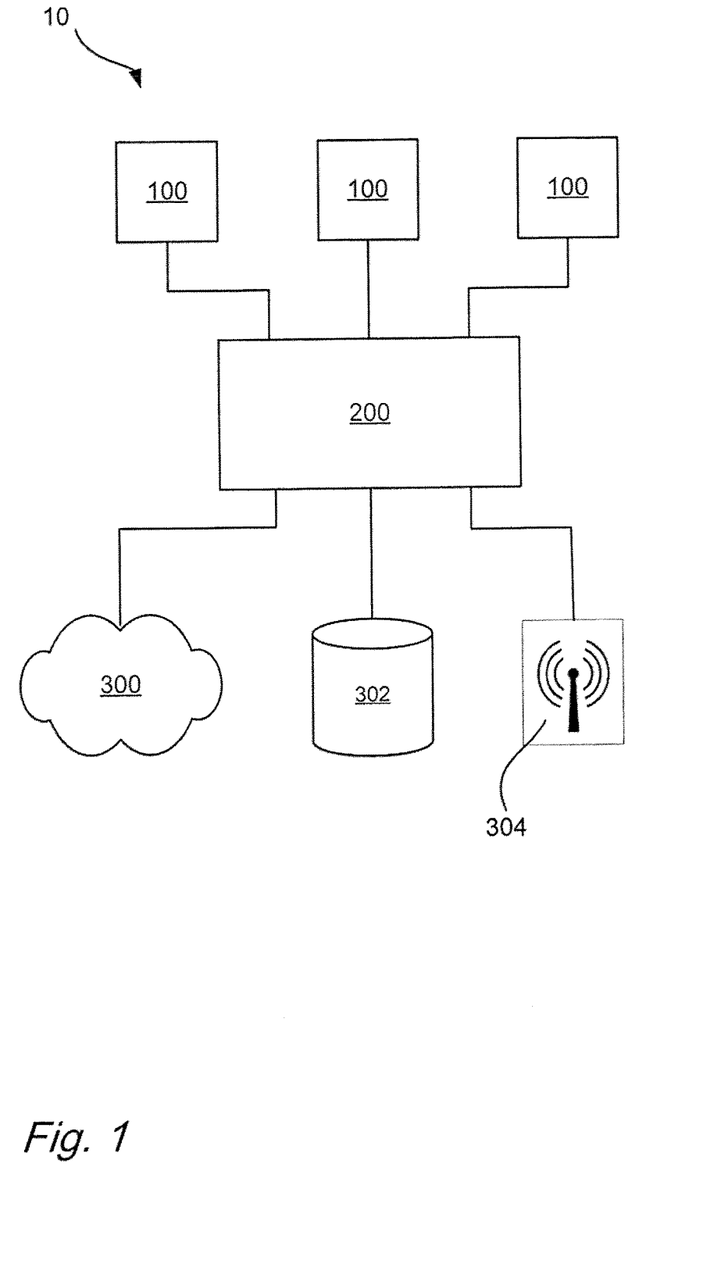
FIG. 1 is a block diagram of a sensor system according to one embodiment of the invention.

The present invention relates to a sensor system 10. The sensor system 10 may be any type of sensor system 10, for example an audio monitoring system or a monitoring system capturing motion video images. According to one embodiment, see FIG. 1, the system includes a plurality of small (e.g. having a dimension of a few centimeters) sensor units 100, which may be simple cameras, microphones, accelerometers, gyroscopes, magnetometers or any other type of sensors, a processing unit 200, and data delivery channels 300, 302, 304. The sensor unit 100 may also be called a "thin sensor", referring to thin client concepts in that the small sensor units 100 may be seen as devices which depend heavily on another more powerful device, e.g. the processing unit 200, to fulfill their traditional role of sensing physical quantities of the environment around each sensor. This stands in contrast to traditional sensors in which the sensors perform all processing up to outputting a completely processed data, for example a completely viewable and shareable motion video. The data delivery channel may be any one of, or any combination of, a computer network 300, e.g. a WAN, a LAN, the Internet, etc., a storage device 302, e.g. a storage server, a data base, an external hard drive, etc., and a radio connection 304, e.g. a wireless LAN, mobile phone network, etc.

Figure 2:
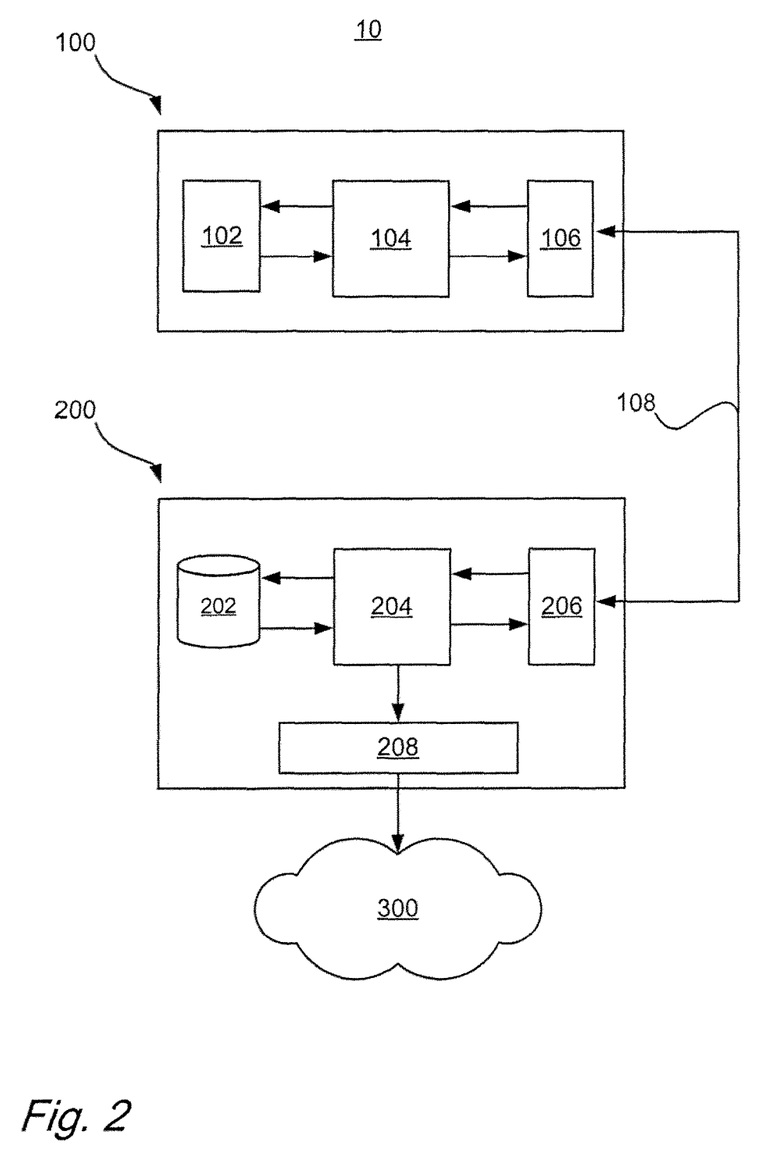
FIG. 2 is a block diagram of a sensor unit and a processing unit according to embodiments of the invention.

FIG. 2 describes by way of example a sensor unit 100 and a processing unit 200 according to embodiments of the invention.

The sensor unit 100 and the processing unit 200 are typically provided as separate units or modules. A connection 108 between the sensor unit 100 and the processing unit 200 may according to some embodiments be an external link, for example a twisted pair cable, extending several meters. This is advantageous in case the sensor unit 100 needs to be positioned far from the processing unit 200. In other embodiments, the sensor unit 100 and the processing unit 200 are separate modules or separate units which are enclosed by a common housing or are mounted in a common support structure. The distance between the two units 100, 200 may be small, e.g. measured in centimeters instead of in meters. The connection 108 described above is only an example, in other embodiments the connection 108 comprise one link for sending data from the processing unit 200 to the sensor unit 100 and another link for sending data in the other direction.

The sensor unit 100 is configured to control a sensor 102, and to packet the raw sensor data for sending to the processing unit 200. The sensor unit is further configured to store sensor unit specific data, i.e. calibration data. A control device in the sensor unit 100 may be implemented using a PLD 104 which in addition to acting as a control device may act as a non-volatile memory. The PLD 104 is thus a combination of a logic device and a memory device. The memory device comprises a memory which may be configured to store calibration data relating to properties of the sensor. The calibration data is used by the processing unit for improving sensor performance by removing structural errors in the sensor outputs. In the case the sensor 102 is an image sensor, examples of such calibration data is information of dead pixels in the image sensor, noise information of the image sensor, flat field correction information etc. In the case the sensor 102 is a magnetic sensor, an example of such calibration data is information about how the output data will change depending on the temperature of the sensor 102. The memory of the PLD 104 may further be configured to store an identifier which identifies and is calculated based on the calibration data as described above.

The logic device of the PLD 104 may be configured for, upon request from the processing device 200 via the link 108, transmitting the identifier stored in the memory of the PLD 104 to the processing device via the link 108. The logic device of the PLD 104 may further be configured for, upon request from the processing device 200 via the link 108, transmitting the calibration data stored in the memory 104 to the processing device 200 via the link 108.

The sensor unit further comprises a serializer/deserializer 106 such that the sensor unit 100 can be connected to the processing unit 200 via a serial protocol. The processing unit 200 comprises a corresponding serializer/deserializer 206.

The processing unit 200 further comprises a memory 202. The memory 202 may be configured for storing calibration data regarding a currently or previously connected sensor unit 100. The processing unit 200 further comprises a processor 204. The processor 204 may be configured to remove any stored calibration data from the memory 202 when storing new calibration data in the memory 202. This may be advantageous since less memory 202 may be required in the processing unit 200. According to other embodiments, the processor is configured store a certain number of unique calibration data in the memory 202.

The memory 202 may further be configured for storing an identifier identifying and being calculated based on the calibration data stored in the memory 202. According to some embodiments, this identifier is calculated by the processor and stored in the memory 202 when the calibration data is stored in the memory 202. The advantage of this may be that the identifier only needs to be calculated once, which saves computational resources. According to other embodiments, the processor stores the identifier received by the connected sensor unit 100, e.g. in step S404 in FIG. 3. Consequently, the identifier never has to be calculated by the processor 204 which saves computational resources. A further advantage of this embodiment is that the received identifier S404 can be used for validating a subsequently received calibration data, as will be further described below. According to yet another embodiment, the processor 204 calculates the identifier every time it has to validate that the correct calibration data is stored in the memory 202 and should be used when processing data from the sensor unit 100. According to this embodiment, the identifier identifying the calibration data stored in the memory 202 is only temporarily stored in the memory 202. This may be advantageous in that it can be discovered if the calibration data stored in the memory 202 is corrupt or otherwise changed since it was last used, as will be described in detail below.

Figure 3:
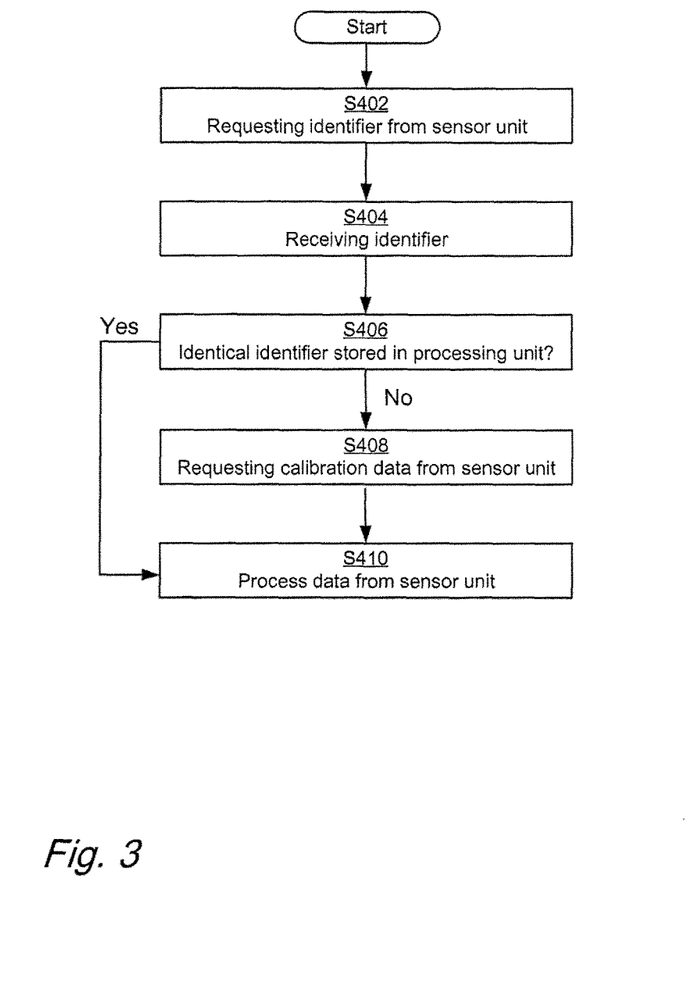
FIG. 3 is a flowchart of a method for determining calibration data according to one embodiment of the invention.

The processor 204 will now be further described in conjunction with FIG. 3 describing a method for determining calibration data to be used when processing data from the sensor unit 100 connected to the processing unit 200. The method may be performed at any time by a processing unit 200, but usually it is performed when the sensor system 10 is started or when a new sensor unit 100 is connected to the processing unit 200. When for example the sensor system 10 is started, the processor 204 may be configured for requesting S402 the connected sensor unit 100 to transmit an identifier which identifies and is calculated based on calibration data stored in the sensor unit 100. When the identifier is received S404, the processor 204 may be configured for checking S406 if an identifier stored in the memory 202 is identical to the received identifier. In the case where a plurality of identifiers is stored in the memory 202, i.e. in the case where a plurality of calibration data is stored in the memory 202, the processor 204 may be configured to stop checking if there is an identifier stored in the memory 202 that is identical to the received identifier if an identical identifier is found in the memory 202. The calibration data indentified by the identical identifier is then used when processing S410 data from the sensor unit.

The processor may further be configured for using the calibration data identified by the identical identifier and stored in the memory 202 when processing data from the sensor unit 100 if the identifier stored in the memory 202 is identical to the received identifier. This means that the currently connected sensor unit 100 has been connected to the processing unit 100 before and consequently the calibration data relating to the currently connected sensor unit is already stored in the memory 202 of the processing unit 200. The calibration data to be used when processing data from the sensor unit 100 has thus been determined by only transmitting a small amount of data between the processing unit 200 and the sensor unit 100. Consequently, an efficient way of determining calibration data to be used when processing data from a sensor unit is achieved.

The, by the processing unit 204, processed data may be transmitted, via a network interface 208, to a data delivery channel, for example a computer network 300.

Each of the identifier received from the sensor unit 100 and the identifier stored in the processing unit 200 may be a checksum calculated from the calibration data it identifies.

Consequently, in order to save time at start-up of the sensor system 10 or when a sensor unit 100 is unplugged and then plugged in again the sensor unit 100 comprises an identification code identifying the present calibration data of the sensor unit, e.g. the checksum of the calibration data. When the sensor unit 100 is plugged in the checksum is transferred S404 to the processing unit 200 where it is compared S406 with the checksum of calibration data presently stored in the processing unit 200. If the checksums are identical, then the calibration data already stored in the processing unit 200 may be used.

The processor 204 may further be configured for requesting S408 the sensor unit 100 to transmit calibration data and using the requested calibration data when processing data from the sensor unit 100 if no identical identifier, e.g. checksum, is found. Consequently, the correct calibration data is used when processing data from the sensor unit 100. In the case the received identifier S404 is stored in the memory 202 by the processor 204, the calibration data transmitted by the sensor unit 100 can be verified. If the transmitted calibration data is received in a corrupt state, this will be noticed by the processor 204, which then can take appropriate actions. For example, the processor 204 can be configured for requesting S408 the sensor unit 100 to transmit the calibration data again. Such verification of the received calibration data may be performed by comparing the received identifier with an identifier calculated from the received calibration data by the processing unit 200.

The correctness of the used calibration data may be further ensured by calculating the checksum with a cryptographic hash function such as a MD5 message-digest algorithm, a MD4 message-digest algorithm, SHA-1, SHA-2 or SHA-3. Such functions have the advantage that the identifier will appear random, e.g. since small differences in the calibration data it identifies may cause the identifier to have a significantly different value. The integrity of the calibration data may thus be improved. Further, since small differences in the calibration data causes significantly different identifiers, such a small differences is likely to be discovered and increase the likelihood that the correct calibration data is used by the processing unit 200 when processing data S410 from the sensor unit 100.

Figure 4:
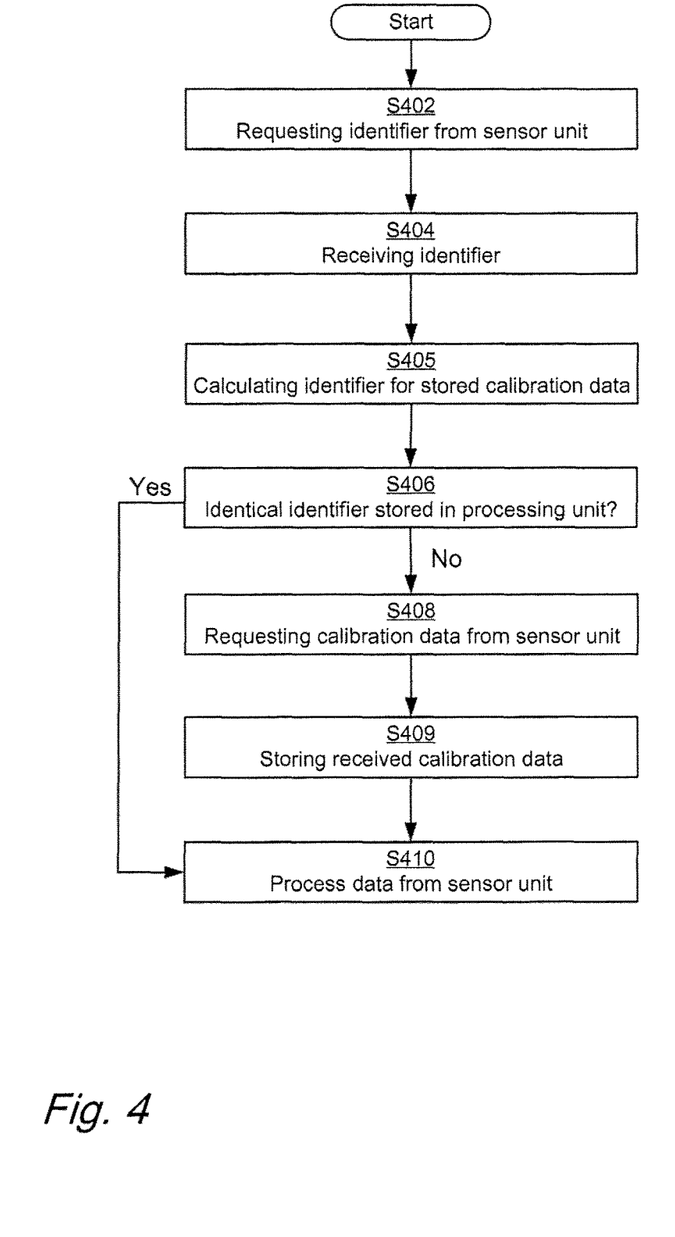
FIG. 4 is a flowchart of a method for determining calibration data according to one embodiment of the invention.

FIG. 4 describes a further embodiment of the method of determining calibration data to be used when processing data from the sensor unit 100 connected to the processing unit 200. The two first steps S402, and S404 are identical with the steps described in conjunction with FIG. 3. However, the method described in FIG. 4 comprises an extra step S405 prior to the step of checking S406 if there is an identifier stored in the processing unit 200, e.g. in the memory 202, that is identical to the received identifier. The additional step comprises calculating S405 an identifier based on calibration data stored in the memory 202 and temporarily storing the calculated identifier. According to this embodiment, the step of checking S406 if there is an identifier stored in the processing unit 200, e.g. in the memory 202, that is identical to the received identifier comprises using the temporarily stored identifier as the identifier stored in the processing unit 200.

According to the embodiment described in FIG. 4, the method comprises another additional step S409 compared to the embodiment described in FIG. 3. In the case the step of checking S406 if there is an identifier stored in the processing unit that is identical to the received identifier results in a negative answer, and the processor 204 consequently requests the sensor unit 100 to transmit calibration data, the present embodiment comprises the step of storing S409 the thus received calibration data in the processing unit 200, e.g. in the memory 202.

Moreover, the skilled person would realize that the method in its various embodiments described in conjunction with FIGS. 1-4 may be implemented in a computer program product comprising a computer-readable medium with instructions for performing said method.

What is claimed is:

1. A method performed in a processing unit for determining calibration data to be used when processing data from a sensor unit connected to the processing unit, the method comprising:
   receiving, from the sensor unit, an identifier which identifies calibration data stored in the sensor unit, the identifier being calculated based on the calibration data stored in the sensor unit;
   checking if there is an identifier stored in the processing unit that is identical to the received identifier from the sensor unit to determine whether to use the calibration data identified by the stored identifier when processing data from the sensor unit without requesting calibration data from the sensor unit, wherein the identifier stored in the processing unit identifies calibration data stored in the processing unit, the identifier stored in the processing unit being calculated based on the calibration data stored in the processing unit;
   using the calibration data stored in the processing unit identified by the identical identifier when processing data from the sensor unit in response to an identical identifier being stored in the processing unit; and
   requesting the sensor unit to transmit calibration data, and using the requested calibration data when processing data from the sensor unit in response to an identical identifier not being stored in the processing unit.

2. The method according to claim 1, wherein after requesting the sensor unit to transmit calibration data, the method further comprises storing the thus received calibration data in the processing unit.

3. The method according to claim 1, wherein each of the identifier received from the sensor unit and the identifier stored in the processing unit is a checksum calculated from the calibration data it identifies.

4. The method according to claim 3, wherein the checksum is a cryptographic hash function.

5. The method according to claim 4, wherein the cryptographic hash function is one of a MD5 message-digest algorithm, a MD4 message-digest algorithm, SHA-1, SHA-2 or SHA-3.

6. The method according to claim 1, wherein a plurality of identifiers is stored in the processing unit, and wherein the checking if there is an identifier stored in the processing unit that is identical to the received identifier is stopped if an identical identifier is found.

7. The method according to claim 1, wherein the checking if there is an identifier stored in the processing unit that is identical to the received identifier comprises:
   prior to the step of checking if a stored identifier is identical to the received identifier;
   calculating an identifier based on calibration data stored in the processing unit; and
   temporarily storing the calculated identifier,
   wherein the checking if there is an identifier stored in the processing unit that is identical to the received identifier comprises using the temporarily stored identifier as the identifier stored in the processing unit.

8. A processing unit configured for determining calibration data to be used when processing data from a sensor unit connected to the processing unit, the processing unit comprises:
   a processor configured for receiving, from the sensor unit, an identifier which identifies calibration data stored in the sensor unit, the identifier being calculated based on the calibration data stored in the sensor unit;
   a memory configured for storing calibration data and an identifier identifying calibration data stored in the processing unit, the identifier stored in the memory being calculated based on the calibration data stored in the processing unit;
   the processor being configured for checking if an identifier stored in the memory is identical to the received identifier to determine whether to use the calibration data identified by the stored identifier when processing data from the sensor unit without requesting calibration data from the sensor unit, for using the calibration data identified by the identical identifier and stored in the memory when processing data from the sensor unit in response to the identifier stored in the memory being identical to the received identifier, and for requesting the sensor unit to transmit calibration data and using the requested calibration data when processing data from the sensor unit in response to no identical identifier being found.

9. The processing unit according to claim 8, wherein the processor is further configured for, after requesting the sensor unit to transmit calibration data, storing the thus received calibration data in the memory.

10. The processing unit according to claim 8, wherein each of the identifier received from the sensor unit and the identifier stored in the memory is a checksum calculated from the calibration data it identifies.

11. The processing unit according to claim 10, wherein the checksum is a cryptographic hash function.

12. The processing unit according to claim 11, wherein the cryptographic hash function is one of a MD5 message-digest algorithm, a MD4 message-digest algorithm, SHA-1, SHA-2 or SHA-3.

13. The processing unit according to claim 8, wherein a plurality of identifiers is stored in the memory, and wherein the processor is configured for stop checking if there is an identifier stored in the processing unit that is identical to the received identifier if an identical identifier is found in the memory.

14. The processing unit according to claim 8, wherein the processor is further configured for, prior to checking if an identifier stored in the memory is identical to the received identifier, calculating an identifier based on calibration data stored in the memory, temporarily storing the calculated identifier in the memory, and using the temporarily stored identifier when checking if there is an identifier stored in the memory that is identical to the received identifier.

15. A sensor system comprising:
a processing unit; and
a sensor unit connected to the processing unit;
wherein the processing unit comprises:
    a processor configured for receiving, from the sensor unit, an identifier which identifies calibration data stored in the sensor unit, the identifier being calculated based on the calibration data stored in the sensor unit;
    a memory configured for storing calibration data and an identifier identifying calibration data stored in the processing unit, and the identifier stored in the memory being calculated based on the calibration data stored in the processing unit;
    the processor being configured for checking if an identifier stored in the memory is identical to the received identifier to determine whether to use the calibration data identified by the stored identifier when processing data from the sensor unit without requesting calibration data from the sensor unit, for using the calibration data identified by the identical identifier and stored in the memory when processing data from the sensor unit in response to the identifier stored in the memory being identical to the received identifier, and for requesting the sensor unit to transmit calibration data and using the requested calibration data when processing data from the sensor unit in response to no identical identifier being found;
wherein the sensor unit comprises:
    a sensor;
    a memory configured to store calibration data, the calibration data relating to properties of the sensor, wherein the memory is further configured to store an identifier which identifies calibration data stored in the sensor unit and is calculated based on the calibration data;
    a transmitter for transmitting the identifier stored in the memory upon request from processing unit; and
    a transmitter for transmitting the calibration data stored in the memory upon request from the processing unit.

* * * * *

UNITED STATES PATENT AND TRADEMARK OFFICE
CERTIFICATE OF CORRECTION

PATENT NO. : 10,152,551 B2
APPLICATION NO. : 14/719289
DATED : December 11, 2018
INVENTOR(S) : Gredegård et al.

It is certified that error appears in the above-identified patent and that said Letters Patent is hereby corrected as shown below:

In the Claims

In Claim 15, at Column 12, Line 1, after the word "unit," delete "and".

Signed and Sealed this
Twenty-sixth Day of February, 2019

Andrei Iancu
*Director of the United States Patent and Trademark Office*